US006050610A

United States Patent [19]
Enderle et al.

[11] Patent Number: 6,050,610
[45] Date of Patent: Apr. 18, 2000

[54] STRESS REDUCTION GROOVE FOR TUBULAR CONNECTION

[75] Inventors: Doug Enderle, Humble; John Greenip, Houston, both of Tex.

[73] Assignee: Hydril Company, Houston, Tex.

[21] Appl. No.: 09/019,611

[22] Filed: Feb. 6, 1998

Related U.S. Application Data

[60] Provisional application No. 60/047,159, May 20, 1997.

[51] Int. Cl.⁷ .................................................. F16L 7/00
[52] U.S. Cl. .......................... 285/94; 285/114; 285/334; 29/428
[58] Field of Search .............................. 285/94, 333, 334, 285/355, 390, 114; 29/428

[56] References Cited

U.S. PATENT DOCUMENTS

| Re. 30,647 | 6/1981 | Blose .................................. 285/332.2 |
| Re. 34,467 | 12/1993 | Reeves ................................... 285/334 |
| 2,177,100 | 10/1939 | Frame . |
| 3,424,479 | 1/1969 | Ditson et al. ............................ 285/94 |
| 4,671,544 | 6/1987 | Ortloff .................................... 285/334 |
| 4,676,529 | 6/1987 | McDonald ............................... 285/92 |
| 4,703,954 | 11/1987 | Ortloff et al. .......................... 285/115 |
| 4,703,959 | 11/1987 | Reeves et al. ........................ 285/332.3 |
| 4,708,038 | 11/1987 | Hellnick et al. .......................... 82/1 C |
| 4,712,815 | 12/1987 | Reeves ................................... 285/334 |
| 4,943,094 | 7/1990 | Simmons ................................. 285/333 |
| 5,060,740 | 10/1991 | Yousef et al. ....................... 285/334 X |
| 5,127,784 | 7/1992 | Eslinger ................................. 411/414 |
| 5,338,074 | 8/1994 | Barringer et al. ...................... 285/334 |
| 5,360,240 | 11/1994 | Mott ........................................ 285/95 |
| 5,427,428 | 6/1995 | Watts ....................................... 285/94 |
| 5,431,831 | 7/1995 | Vincent ................................ 285/94 X |
| 5,454,605 | 10/1995 | Mott ....................................... 285/333 |

FOREIGN PATENT DOCUMENTS

| 3805512 A1 | 9/1988 | Germany . |
| 513952 | 6/1956 | Italy ......................................... 285/94 |
| 2148439 | 5/1985 | United Kingdom ............ F16L 21/02 |

OTHER PUBLICATIONS

PCT International Search Report, Sep. 30, 1998, 5 pages.

*Primary Examiner*—Dave W. Arola
*Attorney, Agent, or Firm*—Rosenthal & Osha L.L.P.

[57] ABSTRACT

A stress reduction groove for tubular connections which relates to a threaded pipe connection, and includes a box member, a pin member, and a continuous groove formed in the thread of one of the members. The box member has a tapered, internal, generally dovetail-shaped thread with stab flanks, load flanks, roots, and crests. The internal thread has a beginning and an end and increases in width in one direction. The pin member also has a tapered, external, generally dovetail-shaped thread with stab flanks load flanks, roots, and crests. The external thread increases in width in the other direction so that the complementary flanks of the respective threads move into engagement during rotational make-up of the connection and form sealing surfaces that resist the flow of fluids between the threads upon rotational make-up of the connection. A section of one of the internal and external threads has the continuous groove formed in the roots thereof. The groove extends from either the beginning or the end of the one thread to a point between the beginning and end of the one thread, thereby reducing the pressure that develops between the sealing surfaces during rotational make-up in a thread lubricant applied to the threads.

22 Claims, 3 Drawing Sheets

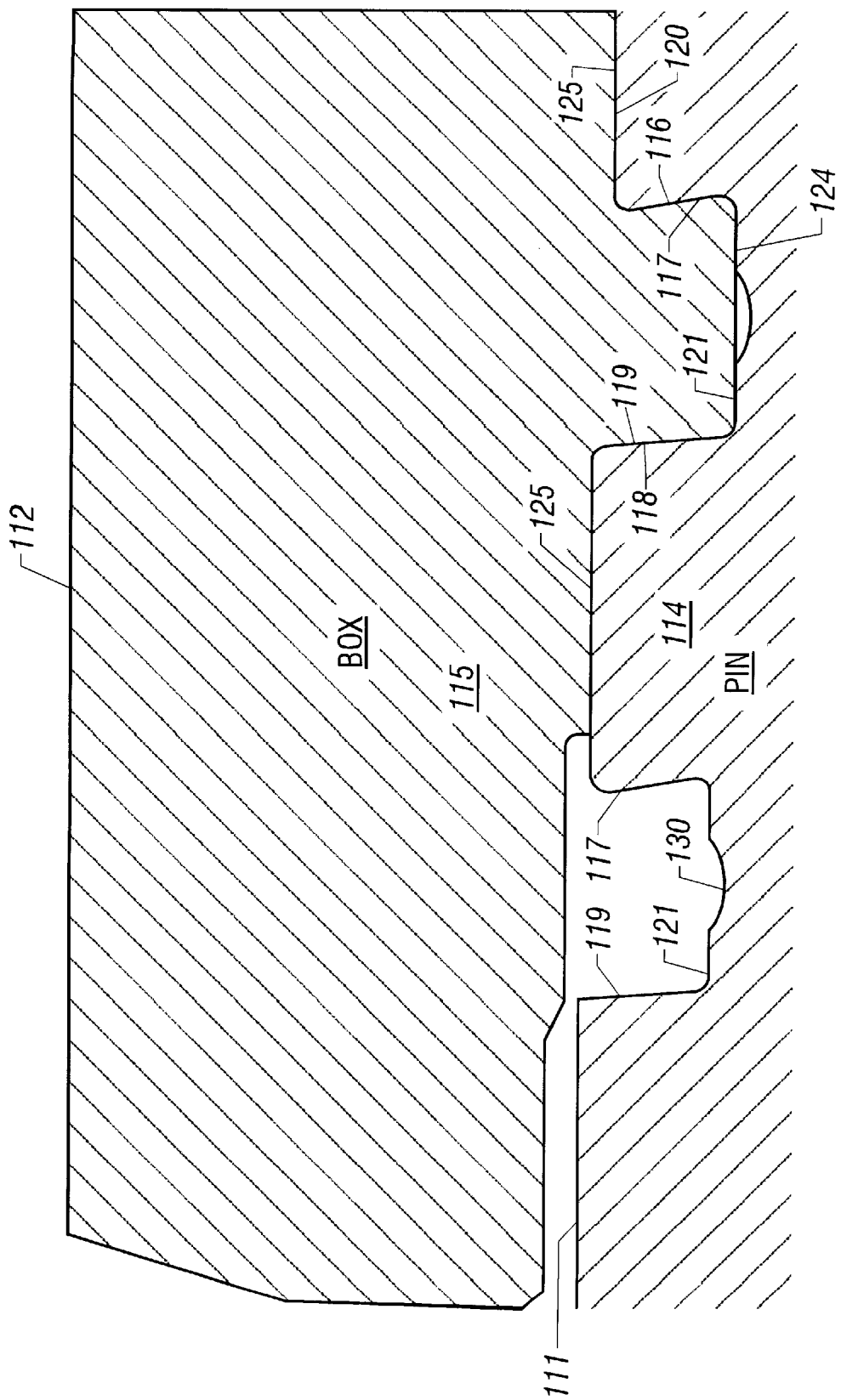

STRESS REDUCTION GROOVE FOR TUBULAR CONNECTION

This application claims the benefit of the filing of the U.S. Provisional Patent Application No. 60/047,159, filed May 20, 1997.

FIELD OF THE INVENTION

The present invention involves threaded tubular joints usable in oil and gas well drilling and production, such as tubing, casing, line pipe, and drill pipe, commonly known collectively as oilfield tubular goods. More particularly, the invention relates to a tubular joint for connecting male (pin) and female (box) members.

BACKGROUND OF THE INVENTION

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

In U.S. Pat. No. RE 30,647 by Blose, a particular thread form is disclosed for a tubular connection that provides a strong joint while controlling the stress and strain in connected pin and box members within acceptable levels. The pin member is equipped with at least one generally dovetail-shaped external thread whose width increases in one direction along the pin, while the box member is equipped with at least one matching generally dovetail-shaped internal thread whose width increases in the other direction. In this manner, the mating set of helical threads provides a wedge-like engagement of opposing pin and box flanks that limits the extent of relative rotation between the pin and box members and defines a forcible make-up condition that completes the connection. In this thread structure, the flank shoulder angles, as well as the thread width, can be used to control the stress and strain preload conditions induced in the pin and box members for a given make-up torque. Thus, by tailoring the thread structure to a particular application or use, the tubular connection or joint is limited only by the properties of the materials selected.

During make-up of a threaded connection in accordance with the teachings of the Blose reissue patent, it has been observed that both liquid and paste-like thread lubricants can temporarily become trapped in the helical clearance or gap formed between the roots and crests of the respective pin and box member threads. The trapped lubricant (also known as thread dope) can, under certain circumstances, produce a torque reading between the relatively sliding pin and box threads indicative of the torque at the made up condition, thereby providing a false indication that the joint has been fully made up. Thereafter, the temporarily trapped thread lubricant can bleed off through the helical clearance between the roots and crests reducing the preload stress and strain to such an extent that the anticipated performance level or strength of the joint cannot be achieved.

U.S. Pat. No. RE 34,467 by Reeves discloses an improvement to the thread structure disclosed in the Blose reissue patent. Specifically, the potential for false torque readings in the joint resulting from trapped thread lubricant in the clearance between the roots and crests of the threads is addressed. Reliance on the torque readings developed by the forcible make-up of the connection is necessary to insure that the design stress and strain preload conditions actually exist in the connection. The Reeves reissue patent discloses a thread structure wherein the box and pin threads are tapered, in addition to having thread widths that increase in opposite directions, so that the roots, crests, and flanks of the threads are moved into engagement as the joint is made up. The threads are particularly designed so that the complementary roots and crests move into engagement before both of the opposing stab and load flanks move into engagement, whereby the volume of lubricant in the clearance between the roots and crests is substantially reduced. In this manner, most of the thread lubricant is displaced to the helical clearance between the opposing load flanks and forms a long, very thin ribbon that has little, if any, effect on the proper make-up of the connection or the ability of the thread surfaces to form seals as they are moved together.

Because of imperfections in the machined, seal forming thread surfaces, like those described in the Reeves reissue patent, thread lubricant can become isolated between sealing surfaces within the tubular connection. Once rotation between the pin and box members has advanced until the thread lubricant entirely fills the isolated volume between the pin and box members, additional rotation will produce an increase in the pressure of the lubricant. This increased pressure can result in higher tangential (hoop) and radial stresses in the connection, particularly in harsh cold weather environments, such as the North Sea, which cause the lubricant to become hardened and more viscous.

SUMMARY OF THE INVENTION

Advantages of the invention may include one or more of the following. A thread lubricant relief path is provided that can be formed in existing oilfield tubular goods without a need to recut the threads.

A threaded pipe connection is provided having a box member and a pin member. The box member has a tapered, internal, generally dovetail-shaped thread with stab flanks, load flanks, roots, and crests. The internal thread has a beginning and an end and increases in width in one direction. Also, the pin member has a tapered, external, generally dovetail-shaped thread with stab flanks, load flanks, roots, and crests. The external thread increases in width in the other direction so that the complementary flanks of the respective threads move into engagement during rotational make-up of the connection and form sealing surfaces that resist the flow of fluids between the threads. A continuous groove is formed in roots of a section of one of the internal and external threads. The groove extends from either the beginning or the end of the one thread to a point between the beginning and end of that thread, thereby reducing the pressure that develops between the sealing surfaces during rotational make-up in a thread lubricant applied to the threads.

A continuous groove may be formed in roots of a section of each of the internal and external threads. The groove extends from either the beginning or the end of the each thread to a point between the beginning and end of the one thread, thereby reducing the pressure that develops between the sealing surfaces during rotational make-up in a thread lubricant applied to the threads.

The present invention provides a means for preventing the undue buildup of thread lubricant pressure between pin and box members by providing a path through which the lubricant can vent. In some embodiments, the present invention provides such venting means are along only a portion of the thread length, whereby the remaining length of the thread can be employed for creating a pressure seal. A thread lubricant relief path is provided that does not change its shape or size with wear in the tubular connection.

BRIEF DESCRIPTION OF THE DRAWINGS

FIG. 5 is an enlarged cross-section of a tubular joint in accordance with an embodiment of the present invention.

DESCRIPTION OF THE PREFERRED EMBODIMENTS

Figure 1:
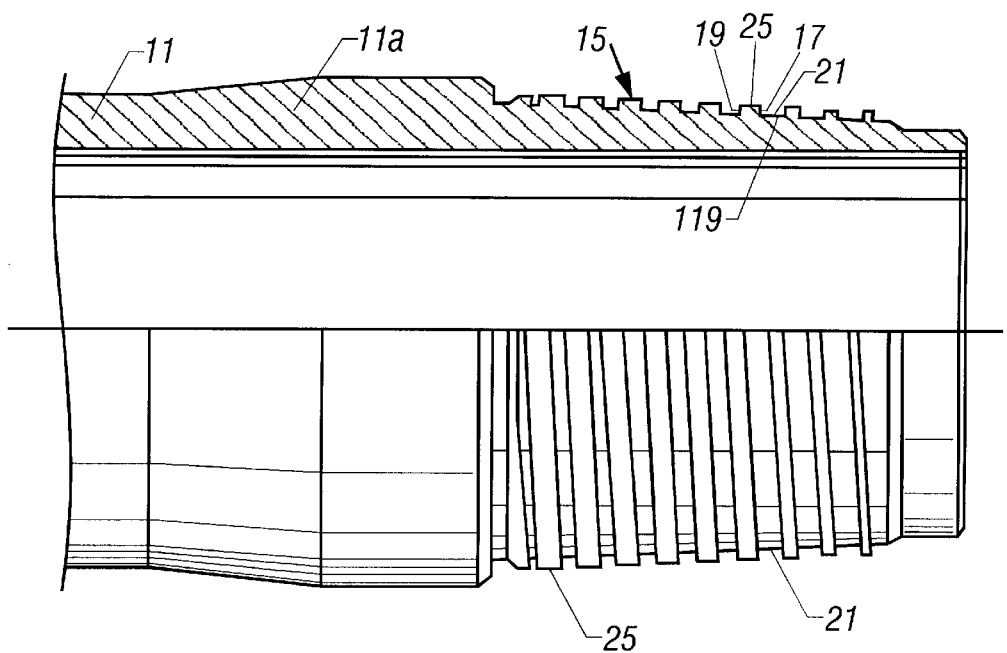
FIG. 1 is a side view, partially in section, of a prior art pin member external thread structure.
Figure 3:
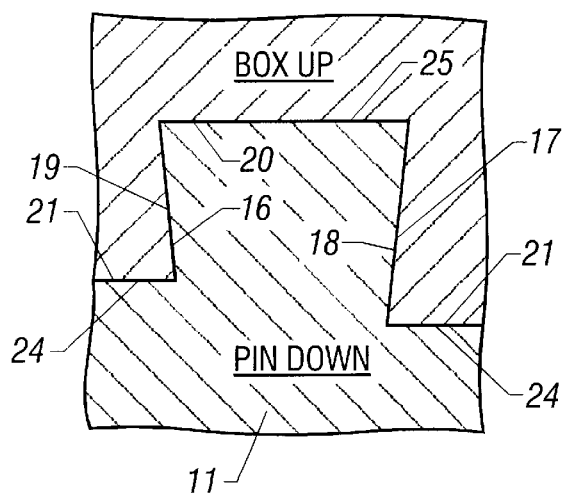
FIG. 3 is an enlarged cross-section of a prior art tubular joint at the point of engagement between a pin member crest and a box member root.
Figure 2:
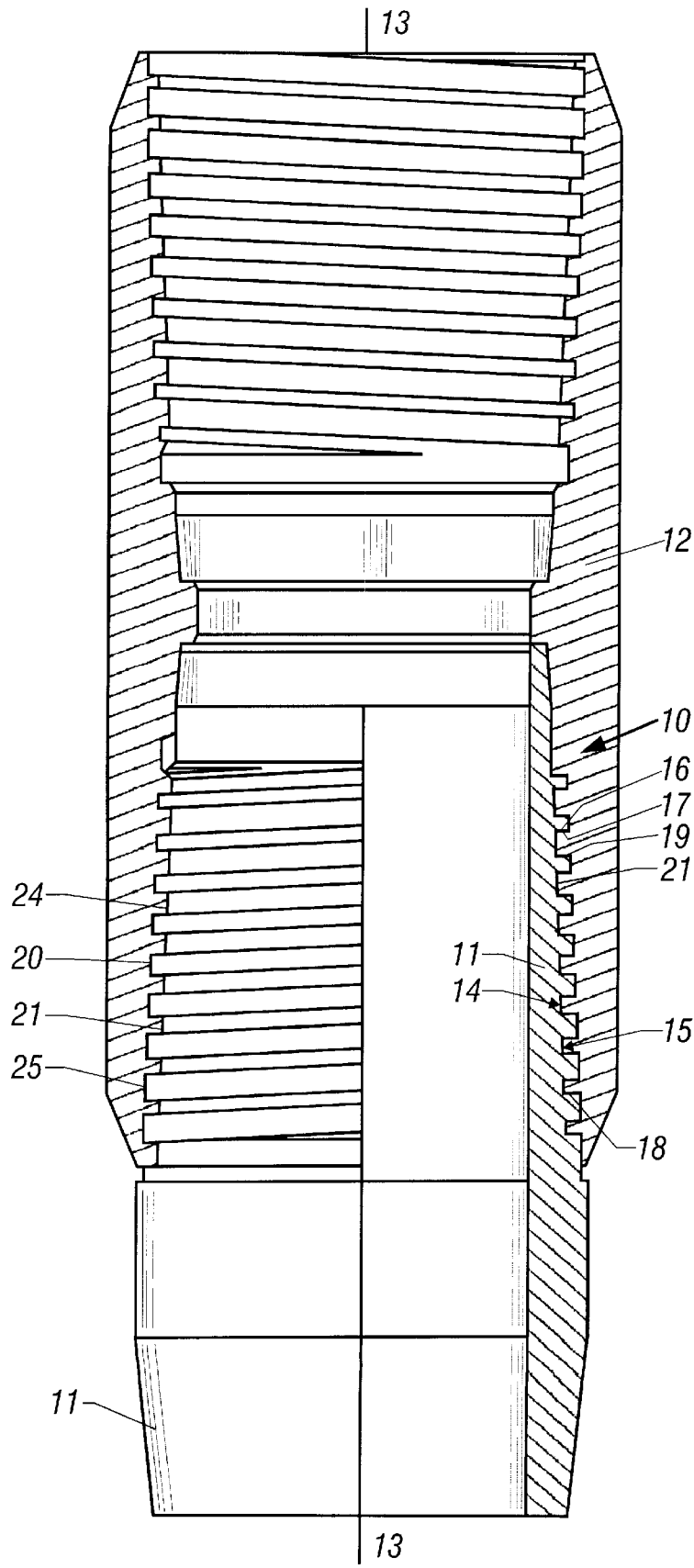
FIG. 2 is a side view, partially in section, of a prior art tubular joint.

Referring to the drawings wherein like reference characters are used for like parts throughout the several views, FIGS. 1, 2, and 3 illustrate a wedge-like thread connection or pipe joint, generally referenced by numeral 10, in accordance with the Reeves reissue patent. As shown in FIG. 2, connection 10 includes a pin member 11 and a box member 12. Box member 12 has tapered, internal, generally dovetail-shaped thread structure 14 formed thereon and adapted for engaging a complementary tapered, external, generally dovetail-shaped thread structure 15 formed on pin member 11 to mechanically secure the box and pin members in a releasable manner.

Internal thread 14 of box member 12 is formed with stab flanks 18, load flanks 16, roots 20, and crests 24, and increases in width progressively at a uniform rate in one direction substantially the entire helical length of thread 14. External thread 15 of pin member 11 is formed with stab flanks 19, load flanks 17, roots 21, and crests 25, and increases in width progressively at a uniform rate in the other direction substantially the entire helical length of thread 15. The oppositely increasing thread widths and the taper of the threads 14 and 15 cause the complementary flanks, roots, and crests of the respective threads to move into forcible engagement during rotational make-up of the connection and form sealing surfaces that resist the flow of fluids between the threads.

The pin member 11 or the box member 12 defines the longitudinal axis 13 of the made-up connection 10. The roots and crests of the box and pin members are flat and parallel to the longitudinal axis of the connection and have sufficient width to prevent any permanent deformation of the threads when the connection is made up.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed. The term "stab flank" designates that side wall surface of the thread that faces toward the outer end of the respective pin or box member and supports the weight of the upper tubular member during the initial make-up of the joint.

An angle alpha is formed between stab flank wall 18 and root wall 20 of thread structure 14. The angle alpha is also formed between stab flank wall 19 and root wall 21 of thread structure 15. Flank wall 16 and root wall 20 of thread 14, as well as flank wall 17 and root wall 21 of thread 15, form a second angle beta. The angles alpha and beta are preferably acute angles to provide dovetail shaped threads. However, it should be realized that a semi-dovetail shaped thread can be provided by defining one of the angles, alpha or beta, as ninety (90) degrees, thus making the appropriate flank wall perpendicular or normal to longitudinal axis 13 of connection 10.

Roots 21 and crests 25 on pin member 11 are dimensioned to eliminate radial clearance with complementary crests 24 and roots 20 of box member 12 during make-up of connection 10. In other words, thread roots 21 and thread crests 25 of pin member 11 come into interference contact with the corresponding thread surfaces of box member 12, upon making the joint hand tight. The elimination of radial clearance between the respective roots and crests of threads 14 and 15 substantially reduces the likelihood of creating chambers between the roots and crests during make-up. These chambers can temporarily trap the thread lubricant or dope and produce false torque readings indicating that the joint has been made up, i.e., that the flanks are in engagement as well as the root/crest engagement.

In practice, however, it has been found that imperfections in the machining of threads 14 and 15 can produce regions wherein the thread lubricant becomes isolated between sealing surfaces in the connection. For example, a preferred embodiment described in the Reeves reissue patent contemplates the engagement of stab flanks as the pin is introduced into the box, followed by the engagement of the corresponding roots and crests at the hand tight position achieved by rotation of pin 11 relative to box 12. Pipe thread dope or lubricant can become isolated between regions of engagement in the root/crest interface at the hand tight position, and thus cannot flow into the clearance that exists between load flanks at that time. Continued rotation of pin 11 relative to box 12 reduces the volume of the lubricant in the trapped regions, due to plastic deformation of the thread surfaces, and causes an increase in the thread lubricant pressure. The increased pressure in the isolated regions results in higher stress and strain preloads than intended for optimal preload conditions in connection 10.

Figure 4:
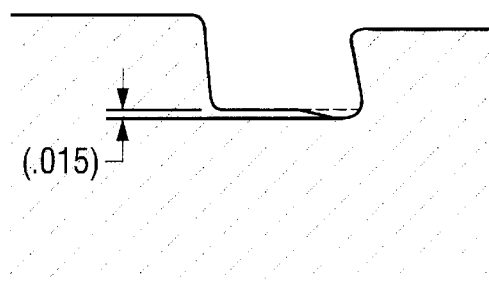
FIG. 4 is an enlarged cross-section of a pin member in accordance with an embodiment of the present invention.

An embodiment of the present invention is shown in FIGS. 4 and 5 in accordance with the wedge thread described in the Reeves reissue patent. Like reference characters to those used in FIGS. 1–3, increased by 100 in magnitude, are used throughout FIGS. 4 and 5 to simplify and shorten the written descriptions. An important feature of the present invention is exemplified by groove 130, which provides a pathway through which the thread lubricant can vent to prevent the buildup of excessive pressure in regions where the lubricant has become trapped between external thread 114 of pin 111 and internal thread 115 of box 112. As the connection is being made up, excess thread lubricant is squeezed into the groove and expelled from the connection, enabling the proper stress and strain preload condition on the tubular connection at make-up.

Groove 130 may be a round bottom groove formed in the roots of pin member thread 114, such as shown in FIG. 5, and may be of a depth between 0.015" and 0.020". Groove 130 can also be formed at the intersection of the root and load flank, as seen in FIG. 4, or can be similarly formed in either of these ways in box member thread 115 with similar results. The use of a round bottom groove machined in root 121 of pin member 111 minimizes the stress concentration at the groove, which in turn reduces peak stress at the groove and maximizes the fatigue strength of connection 110. The locations and shapes of the groove 130 in FIGS. 4 and 5 are shown for illustrative purposes only; those skilled in the art will recognize that the groove 130 may take any shape and be disposed in any location as may be appropriate for a particular application without departing from the spirit and scope of this invention.

Groove 130 is machined in a section of external thread 114 in continuous fashion, but in some embodiments is formed only over a limited portion (not shown) of the thread. Thus, the groove is only of a length that extends from either the beginning or the end of the thread to a point between the beginning and end of the thread, providing a limited pathway for venting excessive pressure of the thread lubricant that develops between the sealing surfaces during rotational make-up. Because the pressure reduction path may be employed over a limited portion of the thread, the remaining portion of the thread length can be used to form an internal and external pressure seal, e.g., in the manner disclosed by the threaded tubular connection of the Reeves reissue patent.

Those skilled in the art will appreciate that the present invention is equally applicable to threaded connections wherein slight clearance exists between complementary roots and crests, such as described in the Blose reissue patent. In such thread structures, e.g., those having clearances of 0.003" (0.006" total for both sides of connection) up to 0.006" (0.012" total), the thread lubricant can itself form a seal under high pressure that resists the flow of fluids across the connection. When tubular joints are exposed to severe cold weather environments, such as in the North Sea and Canada during the winter months, the thread lubricant becomes somewhat incompressible and very difficult to displace from clearances between the pin and box members. When the lubricant is unable to flow freely, it is subjected to increased pressure by the rotational make-up of the joint. The use of pressure reduction groove 130 provides a pathway for the highly pressurized lubricant to escape, ensuring that the stress and strain resulting from forcible make-up of the connection will not substantially exceed the designed preload condition.

In this regard, it is well known that wear develops in thread surfaces 114 and 115 as the connection is made up and disassembled several times, and such action will gradually permit additional travel of pin member 111 into box member 112 and eventually eliminate any radial clearance between the corresponding roots and crests. Such wear, however, will have no detrimental effect on the operation of groove 130 since the relief path will not substantially change shape or size with typical wear in the threaded joint. Furthermore, the fact that the relief path is machined in the threads independently of the threads themselves makes the present invention well suited for application to existing oilfield tubular goods with minimal cutting requirements.

From the foregoing it will be seen that this invention is one well adapted to attain all of the ends hereinabove set forth, together with other advantages which are obvious and which are inherent to the disclosed apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

For example, although described with regard to a single thread set, the present invention is similarly applicable to a tubular connection having more than one thread set, such as a two-step thread seal connection.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A threaded pipe connection, comprising:
    a box member having a tapered, internal, generally dovetail-shaped thread with stab flanks, load flanks, roots, and crests, the internal thread having a beginning and an end and increasing in width in one direction;
    a pin member having a tapered, external, generally dovetail-shaped thread with stab flanks, load flanks, roots, and crests, the external thread increasing in width in the other direction so that complementary flanks of the respective threads move into engagement during rotational make-up of the connection and form sealing surfaces that resist the flow of fluids between the threads upon rotational make-up of the connection;
    a section of one of the internal and external threads having a continuous groove formed in the roots thereof that extends from one of the beginning and the end of the one thread to a point between the beginning and end of the one thread for reducing pressure that develops between the sealing surfaces during rotational make-up in a thread lubricant applied to the threads.

2. The connection of claim 1, wherein the internal and external threads are tapered so that the complementary roots and crests move into engagement during rotational make-up of the connection and form sealing surfaces that resist the flow of fluids between the threads.

3. The connection of claim 2, wherein the groove is formed at an intersection of the root and load flank of the one thread.

4. The connection of claim 1, wherein the groove is a round bottom groove formed in the roots of the one thread.

5. The connection of claim 1, wherein the continuous groove is formed in the roots of the pin member.

6. The connection of claim 1, wherein the continuous groove is formed in the roots of the box member.

7. The connection of claim 1, wherein the roots and crests of the box and pin members are flat and parallel to a longitudinal axis of the connection.

8. The connection of claim 1, wherein the roots and crests of the box and pin members have sufficient width to prevent any permanent deformation of the threads when the connection is made up.

9. The connection of claim 1, wherein the roots and crests are adapted to move into engagement before both the load flanks and stab flanks move into engagement to complete the sealing of the connection.

10. The connection of claim 9, wherein one of the stab flanks and load flanks is moved into engagement as the pin member is moved into the box member by relative rotation of the members;
    the roots and crests are moved into engagement during rotational make-up of the connection; and
    the other of the stab flanks and load flanks is moved into engagement upon rotational make-up of the connection.

11. The connection of claim 9, wherein the stab flanks are moved into engagement as the pin member is moved into the box member by relative rotation of the members;

the roots and crests are moved into engagement during rotational make-up of the connection; and the load flanks move into engagement upon rotational make-up of the connection.

12. A method of relieving stress from a threaded pipe connection comprising:

providing a box member having a tapered, internal, generally dovetail-shaped thread with stab flanks, load flanks, roots, and crests, the internal thread having a beginning and an end and increasing in width in one direction;

providing a pin member having a tapered, external, generally dovetail-shaped thread with stab flanks, load flanks, roots, and crests, the external thread increasing in width in the other direction so that complementary flanks of the respective threads move into engagement during rotational make-up of the connection and form sealing surfaces that resist the flow of fluids between the threads upon rotational make-up of the connection; and forming a continuous groove in the roots of a section of one of the internal and external threads that extends from one of the beginning and the end of the one thread to a point between the beginning and end of the one thread for reducing pressure that develops between the sealing surfaces during rotational make-up in a thread lubricant applied to the threads.

13. The method of claim 12, further comprising:

providing tapered internal and external threads.

14. The method of claim 13, wherein the complementary roots and crests move into engagement during rotational make-up of the connection and form sealing surfaces that resist the flow of fluids between the threads.

15. The method of claim 12, wherein the groove is a round bottom groove formed in the roots of the one thread.

16. The method of claim 13, further comprising:

forming the groove at an intersection of the root and load flank of the one thread.

17. The method of claim 12, wherein the continuous groove is formed in the roots of the pin member.

18. The method of claim 12, wherein the continuous groove is formed in the roots of the box member.

19. The method of claim 12, further comprising:

forming the roots and crests of the box and pin members flat and parallel to a longitudinal axis of the connection.

20. The method of claim 12, further comprising:

forming the roots and crests of the box and pin members with sufficient width to prevent any permanent deformation of the threads when the connection is made up.

21. The method of claim 12, further comprising:

adapting the roots and crests to move into engagement before both the load flanks and stab flanks move into engagement to complete the sealing of the connection.

22. A method of relieving stress while making-up a threaded connector, comprising:

providing a box member having a tapered, internal, generally dovetail-shaped thread with stab flanks, load flanks, roots, and crests, the internal thread having a beginning and an end and increasing in width in one direction;

providing a pin member having a tapered, external, generally dovetail-shaped thread with stab flanks, load flanks, roots, and crests, the external thread increasing in width in the other direction so that complementary flanks of the respective threads move into engagement during rotational make-up of the connection and form sealing surfaces that resist the flow of fluids between the threads upon rotational make-up of the connection; and applying a thread lubricant to the threads of at least one of the box member and the pin member; and rotationally engaging the box and pin members to force the thread lubricant to flow through a groove formed in the roots of a section of one of the internal and external threads that extends from one of the beginning and the end of the one thread to a point between the beginning and end of the one thread.

* * * * *

UNITED STATES PATENT AND TRADEMARK OFFICE
CERTIFICATE OF CORRECTION

PATENT NO.   : 6,050,610
DATED        : April 18, 2000
INVENTOR(S)  : Doug Enderle, et. al.

It is certified that error appears in the above-indentified patent and that said Letters Patent is hereby corrected as shown below:

Title page, item [56], under References Cited," replace "5,427,428" with --5,427,418--.

Signed and Sealed this

Twentieth Day of March, 2001

*Attest:*

NICHOLAS P. GODICI

*Attesting Officer*    Acting Director of the United States Patent and Trademark Office